Figure 1:
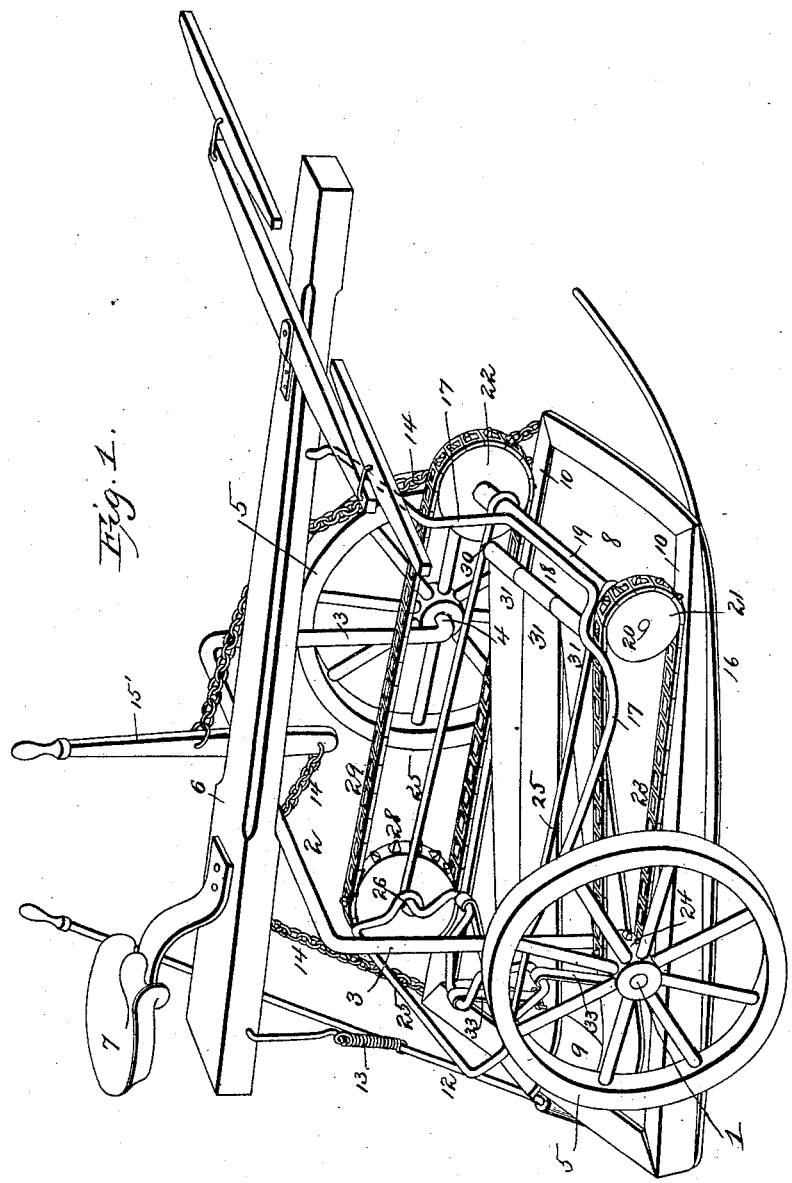

(No Model.)

2 Sheets—Sheet 1.

G. CARLSON.
POTATO BUG GATHERER.

No. 472,428.

Patented Apr. 5, 1892.

WITNESSES.
F. L. Durand
J. W. Coombs

INVENTOR:
Gustave Carlson,
by Saurs Bagger & Co.
Attorneys.

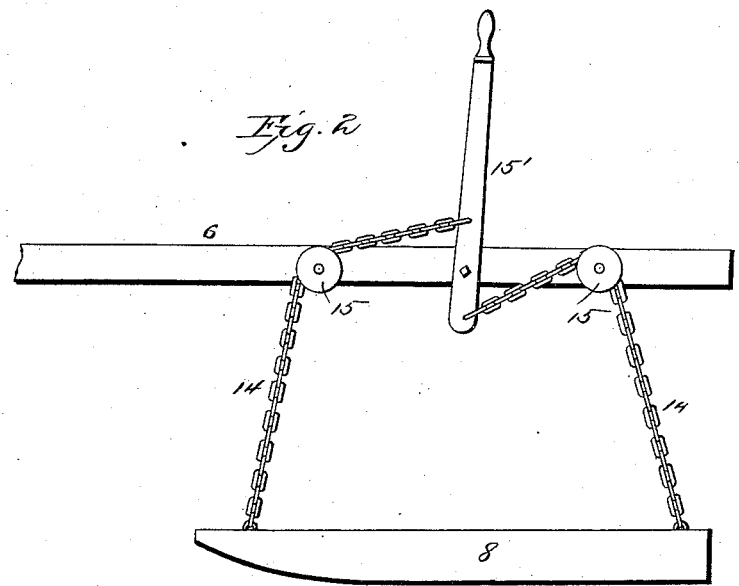
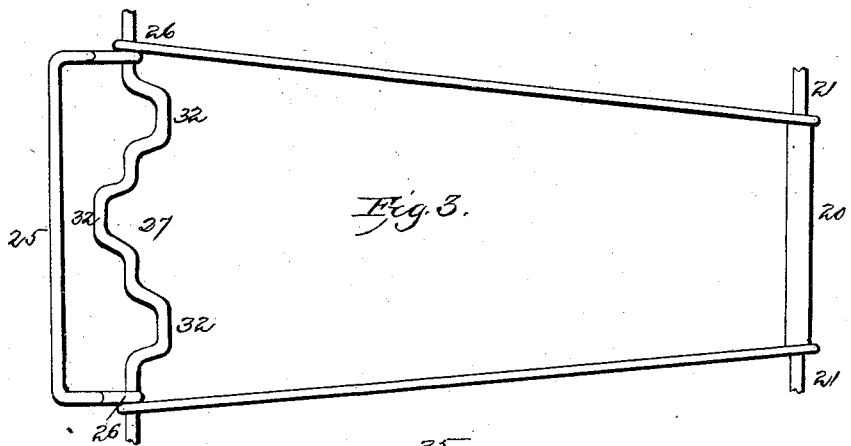
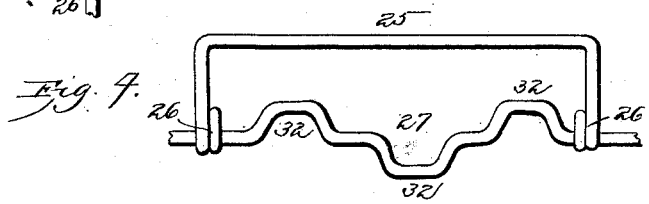
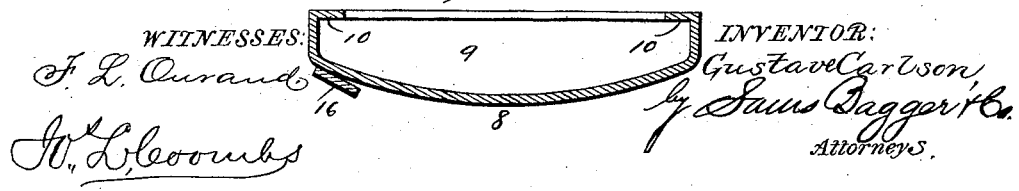

UNITED STATES PATENT OFFICE.

GUSTAVE CARLSON, OF SPARKS, ASSIGNOR OF ONE-HALF TO CHARLES H. CORNELL, OF VALENTINE, NEBRASKA.

POTATO-BUG GATHERER.

SPECIFICATION forming part of Letters Patent No. 472,428, dated April 5, 1892.

Application filed May 11, 1891. Serial No. 392,345. (No model.)

*To all whom it may concern:*

Be it known that I, GUSTAVE CARLSON, a citizen of the United States, and a resident of Sparks, in the county of Cherry and State of Nebraska, have invented certain new and useful Improvements in Potato-Bug Harvesters; and I do hereby declare that the following is a full, clear, and exact description of the invention, which will enable others skilled in the art to which it appertains to make and use the same, reference being had to the accompanying drawings, which form a part of this specification.

My invention relates to improvements in apparatus for ridding growing plants of insects, being principally designed for collecting or gathering potato-bugs from vines in order that they may be destroyed.

The invention consists in the novel construction and combination of parts hereinafter fully described, and specifically pointed out in the claim.

In the accompanying drawings, Figure 1 is a perspective view of an apparatus constructed in accordance with my invention. Figs. 2, 3, 4, and 5 are detail views.

In the said drawings the reference-numeral 1 designates the axle, consisting of the horizontal portion 2, vertical arms 3, and outwardly-projecting arms 4, forming spindles for the wheels 5. Upon this horizontal portion is mounted a beam 6, carrying a seat 7 at its rear end and at its front end provided with a doubletree, with which the draft-animals are connected. As shown, the arrangement is designed for two horses; but it is obvious that a single animal could be used, if desired. Located underneath this beam is a hopper 8, consisting of a trough-shaped or curved metal plate, the front end of which is turned upwardly or curved, while at its rear it is provided with an end piece 9. The edges of this hopper are turned over, forming inwardly-projecting flanges 10, which prevent the escape of any insects thrown thereon. At its rear this hopper is connected with a lever 12, which is pivoted near its upper end to the beam 6 and is within easy reach of the operator, mounted upon the seat 7.

The numeral 13 designates a coiled spring, one end of which is secured to the rear end of the beam 6, while the other end is connected with the lever 12 in such manner that said hopper will be pressed downwardly toward the ground. The hopper is provided at its front and rear ends with chains 14, which extend upwardly around sheaves 15 and are connected with an operating-lever 15', by means of which the hopper can be raised out of contact with the ground when not in use. Upon the bottom of the hopper at one side is a steel plate 16, forming a guard therefor.

The numeral 17 designates an arm having one end secured to the axle and its other end connected with the beam 6 and having a loop 18 and a sleeve 19, within which is journaled a shaft 20, having at the ends sprocket-wheels 21 and 22, one of which 21 is connected by sprocket-chain 23 with a similar wheel 24, secured to or formed with one of the driving-wheels. The object of the arm 17 is to support the axle 20 and wheels 21 and the front end of yoke 25. Extending rearwardly from the sleeve 19 is a U-shaped yoke 25, having loops 26, forming the journals of a cranked shaft 27, upon one end of which is a sprocket-wheel 28, connected by chain 29 with wheel 22. At the front of the U-shaped yoke is a transverse rod or bar 30, to which are pivoted a number of rearwardly-extending beating-arms 31, which are connected at the rear ends with the crank 32 of shaft 27 by means of pivoted rods or bars 33.

It will be noted that the hopper and beating-arms are located at the right-hand side of the apparatus and that they are also slightly inclined.

The operation is as follows: The apparatus will be run over the rows of potato-hills with the hopper close up to the vines, being pressed closely to the ground by means of the coiled spring before described. As the machine moves the beating-arms will be actuated by the sprocket-chains, pulleys, and cranks, causing them to strike the vines and throw the bugs or insects thereon into the hopper, they being unable to escape therefrom by reason of the turned-over edges. When desired, the apparatus may be stopped and the insects collected and destroyed.

In place of the loop 18 the sleeve 19 can be connected with a spring, by which the height thereof may be regulated.

Having thus described my invention, what I claim is—

In an insect-collector, the combination, with the axle, the wheels, and the beam, of the curved hopper connected with said beam by means of a pivoted lever and having inwardly-turned edges, the arm connected with the axle and beam and having a loop carrying a sleeve, the yoke connected with said sleeve, the transverse rod secured to said yoke and provided with pivoted beating-arms, the shaft having cranks connected with said beating-arms, the shaft passing through said sleeve provided with sprocket-wheels, the sprocket-wheels on the cranked shaft and one of the driving-wheels, and two sprocket-chains, substantially as described.

In testimony that I claim the foregoing as my own I have hereunto affixed my signature in presence of two witnesses.

GUSTAVE CARLSON.

Witnesses:
CHARLES G. ANDERSON,
A. T. WHITE.